US009957045B1

(12) United States Patent
Daly

(10) Patent No.: US 9,957,045 B1
(45) Date of Patent: May 1, 2018

(54) STACKABLE DRONES

(71) Applicant: Brehnden Daly, Lake Mary, FL (US)

(72) Inventor: Brehnden Daly, Lake Mary, FL (US)

(*) Notice: Subject to any disclaimer, the term of this patent is extended or adjusted under 35 U.S.C. 154(b) by 0 days. days.

(21) Appl. No.: 15/694,805

(22) Filed: Sep. 3, 2017

(51) Int. Cl.
B64C 37/02 (2006.01)
B64C 39/02 (2006.01)
G05D 1/00 (2006.01)
G05D 1/10 (2006.01)

(52) U.S. Cl.
CPC ............ B64C 37/02 (2013.01); B64C 39/024 (2013.01); G05D 1/0027 (2013.01); G05D 1/104 (2013.01); B64C 2201/108 (2013.01); B64C 2201/128 (2013.01)

(58) Field of Classification Search
CPC ............ B64C 2201/108; B64C 39/024; B64C 2201/027; B64C 2201/128; B64C 37/02; B64C 2201/042; B64C 2201/143; B64C 2201/146; B64C 2201/148; B64C 2211/00; B64C 25/58; B64C 27/08; B64C 39/022; G05D 1/104; G05D 1/0027; B64F 3/02; H02G 11/00
See application file for complete search history.

(56) References Cited

U.S. PATENT DOCUMENTS

| 3,253,806 A * | 5/1966 | Eickmann | B64C 27/12 244/17.23 |
| 7,334,755 B2 * | 2/2008 | Svoboda, Jr. | B64C 27/08 244/17.23 |
| 8,919,691 B2 * | 12/2014 | Lindmark | B63B 1/041 244/101 |
| 9,457,899 B2 * | 10/2016 | Duffy | B64C 37/02 |
| 2009/0216394 A1 * | 8/2009 | Heppe | B64C 39/024 701/16 |
| 2011/0226892 A1 * | 9/2011 | Crowther | B64C 1/30 244/17.23 |

(Continued)

FOREIGN PATENT DOCUMENTS

WO 2014080386 A2 5/2014

OTHER PUBLICATIONS

Keh-Sik Min, "Study on the Contra-Rotating Propeller System Design and Full-Scale Performance Prediction Method", International Journal of Naval Architecture and Ocean Engineering, 2009 pp. 29-38, vol. 1, Issue 1, published internationally by authors located in Ulsan, South Korea.

(Continued)

Primary Examiner — Medhat Badawi
(74) Attorney, Agent, or Firm — John V. Stewart

(57) ABSTRACT

A drone (2) has an upper coupler (6) that releasably connects to a lower coupler (8) of a second drone (4), interconnecting the drones in a stacked combined flying machine (5A). The couplers index a predetermined rotational relationship between the two drones about a central vertical axis (10). An embodiment (5C) provides coaxial counter-rotating propellers of the respective upper and lower drones. Other embodiments rotationally offset the upper and lower drones to minimize overlap (A1, A2) of the upper and lower propeller disks or to overlap only portions (A1) of the propeller disks that rotate in opposite directions. The couplers may have electrical connectors that integrate control systems (38, 40) that establish a master/slave control relationship.

19 Claims, 4 Drawing Sheets

(56) References Cited

U.S. PATENT DOCUMENTS

| | | | | |
|---|---|---|---|---|
| 2012/0241553 | A1* | 9/2012 | Wilke | B64C 27/08 244/17.13 |
| 2013/0233964 | A1* | 9/2013 | Woodworth | B64C 37/02 244/2 |
| 2014/0061362 | A1* | 3/2014 | Olm | B60F 5/02 244/2 |
| 2014/0263823 | A1* | 9/2014 | Wang | B64C 39/028 244/17.23 |
| 2016/0123182 | A1* | 5/2016 | Samaritano | B64C 27/08 416/1 |
| 2016/0288901 | A1* | 10/2016 | Fisher | B64C 11/02 |
| 2016/0291445 | A1* | 10/2016 | Fisher, Sr. | G03B 15/006 |
| 2016/0311526 | A1* | 10/2016 | Geise | B64C 27/08 |
| 2016/0332747 | A1* | 11/2016 | Bradlow | B64D 47/08 |
| 2016/0340021 | A1* | 11/2016 | Zhang | B64C 27/08 |
| 2016/0378108 | A1* | 12/2016 | Paczan | B64C 37/02 705/330 |
| 2017/0030715 | A1* | 2/2017 | Song | G01C 19/5783 |
| 2017/0121034 | A1* | 5/2017 | Fisher | B64D 47/08 |
| 2017/0183074 | A1* | 6/2017 | Hutson | B64C 1/061 |
| 2017/0225782 | A1* | 8/2017 | Kohstall | B64C 39/024 |
| 2017/0355460 | A1* | 12/2017 | Shannon | B64C 39/024 |

OTHER PUBLICATIONS amazon.com on-line catalog item, "Xfold SPY-8URTF Rigs SPY X8 Octocopter", retrieval date Aug. 4, 2017, published internationally.

adorama.com on-line catalog item, "xFold Dragon x12 RTF KDE Drone", retrieval date Aug. 4, 2017, published internationally.

* cited by examiner

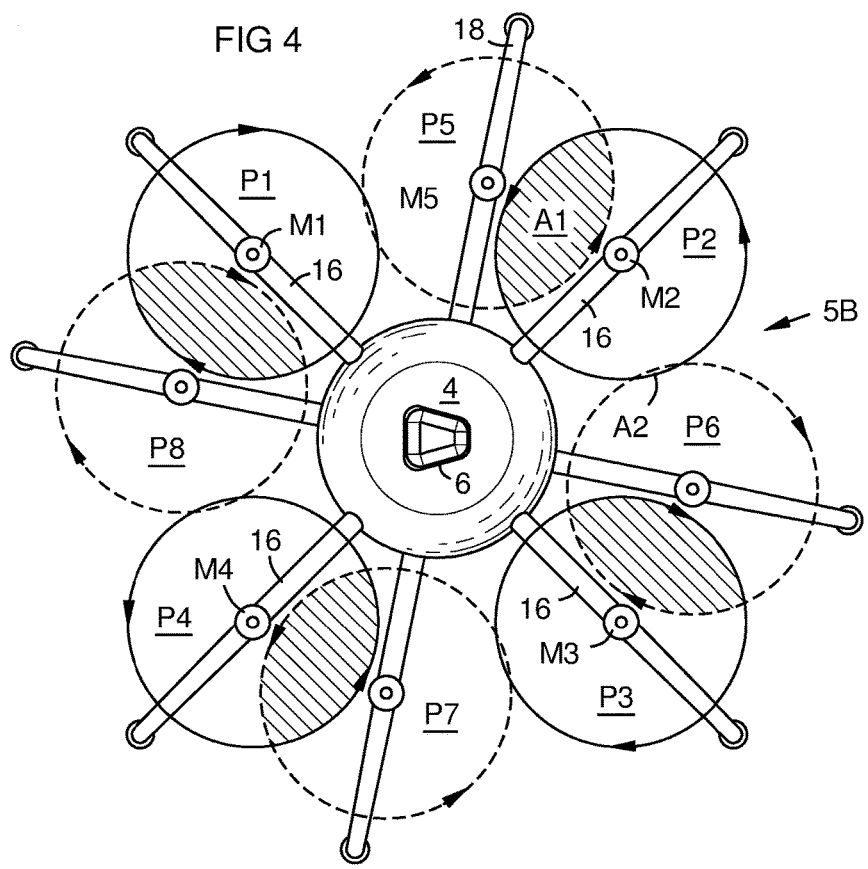
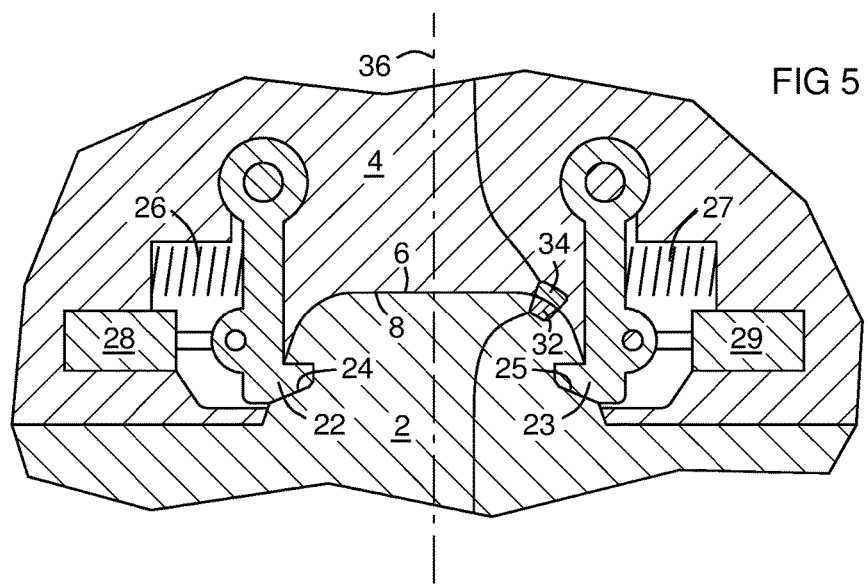

STACKABLE DRONES

FIELD OF THE INVENTION

This invention relates to combining two or more flying machines into a vertically stacked unified flying assembly, especially the releasable stacking of multi-copter drones.

BACKGROUND OF THE INVENTION

Multi-copter drones provide aerial delivery of packages. A drone can be overloaded by a large package and under-utilized by a small package. Using only large drones would result in unnecessary expense for most packages. This can be addressed with a fleet of different sized drones. However, the need for a given sized drone at a given location at a given time is largely unpredictable, resulting in wasteful relocating of unloaded drones or often using local drones that are larger than needed.

U.S. Pat. No. 9,457,899 and US patent application 2016/0378108 teach connecting multiple drones side-by-side into a collective unmanned aerial vehicle (UAV) that can carry larger packages but can separate into smaller or single vehicles for smaller packages. This prior art teaches connecting the drones to each other by connectors on their propeller guards and related peripheral parts.

BRIEF DESCRIPTION OF THE DRAWINGS

The invention is explained in the following description in view of the drawings that show:

FIG. 4 is a top view of an embodiment with a different drone rotational offset.

FIG. 5 is a sectional view of a coupling mechanism for interconnecting the stacked drones.

DETAILED DESCRIPTION OF THE INVENTION

Figure 1:
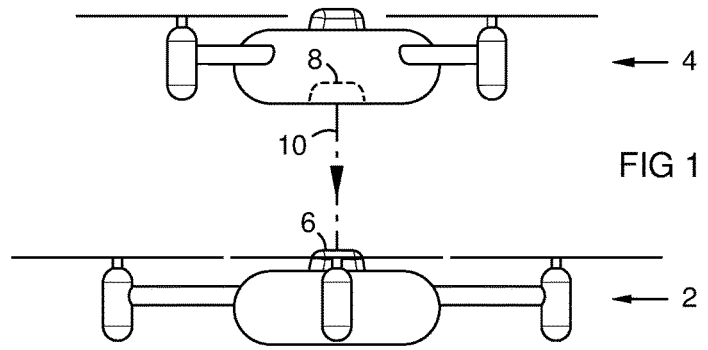
FIG. 1 is a side view of a top drone landing on a bottom drone to form a combined flying machine.

FIG. 1 shows a top drone 4 landing on a bottom drone 2 for coupling in a vertically stacked drone configuration. A coupling protrusion 6 or convexity on the bottom drone will be received into a matching socket 8 or concavity on the top drone. A latch mechanism will connect the two drones together as a combined flying machine with more lift than a single drone. The drones are rotationally offset from each other by 45 degrees about a central vertical axis 10 so the propellers are staggered in the top view of FIG. 3. Other offsets are possible as later shown, including a 90-degree offset that provides coaxial counter-rotating propellers in the stack of drones.

Figure 2:
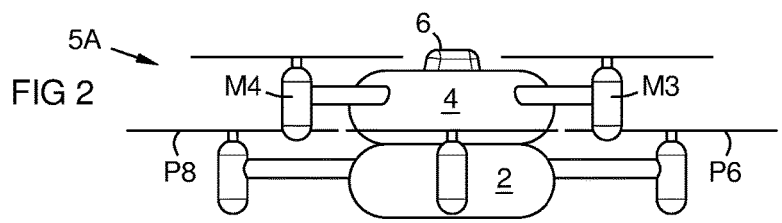
FIG. 2 is a side view of two vertically stacked drones forming a combined flying machine.

FIG. 2 shows the top drone 4 coupled to the bottom drone 2 forming a combined flying machine 5A with approximately twice the lift of a single drone. Each drone may have a coupling protrusion 6 on top and a coupling socket 8 (FIG. 1) on the bottom so that any drone in a fleet can be a top or bottom drone. This allows a delivery package to be attached to any convenient drone in the fleet, then any other available drone in the fleet can be connected on top of the first drone as needed.

Figure 3:
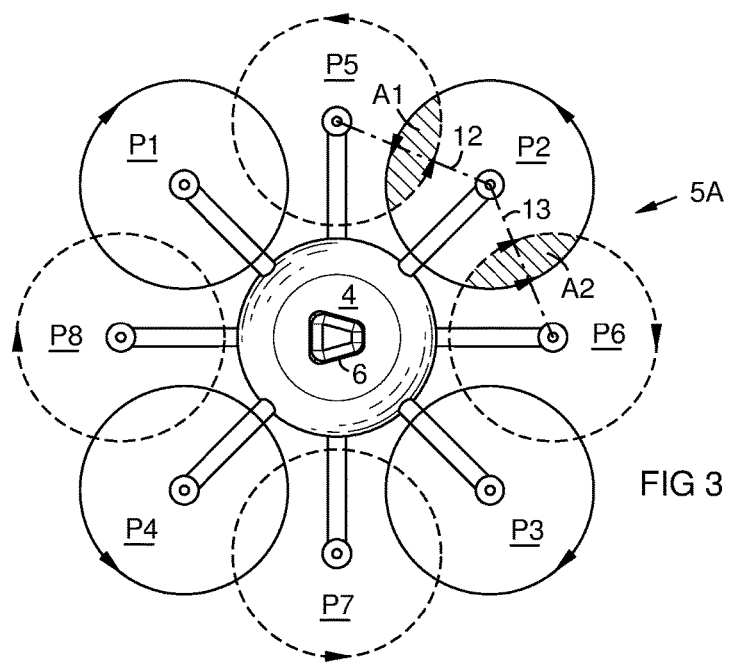
FIG. 3 is a top view of the stacked drones of FIG. 2.

The lower drone propellers P6, P8 could hit the upper motors M3, M4 unless the drones are rotationally offset as in FIG. 3. Alternately, the drone bodies 2, and 4 can be taller so there is no interference in any position. With a taller body for example, the upper and lower drones can be rotationally offset 90 degrees to provide coaxial counter-rotating propellers as later shown.

FIG. 3 is a top view of the stacked drones of FIG. 2. The upper propellers are indicated by disks P1, P2, P3, and P4. The lower propellers are indicated by dashed line disks P5, P6, P7, and P8. Multi-copters normally have an even number of propellers, with half of them rotating clockwise, and the other half rotating counter-clockwise to neutralize net torque. In FIG. 3, the top drone 4 has two clockwise propellers P1, P3 and two counter-clockwise propellers P2, P4.

An objective of the invention is to minimize negative aerodynamic effects of the downwash from the upper propellers on the lower propellers. Rotationally offsetting the drones by 45 degrees as in FIG. 3 minimizes the total blade disk overlap. The upper and lower propeller disks may or may not partially overlap in this configuration, depending on the diameter of the propellers relative to their lateral distance from the drone center. The offset angle for minimal overlap depends on the number of propellers in the drones.

In the example of FIG. 3, blade P2 overlaps blades P5 and P6 in areas A1 and A2 respectively. In area A1, the upper and lower blades move in opposite rotational directions. In a top view the blades cross a line 12 drawn between the centers of rotation in opposite directions as shown by arrows. This can increase lift on the lower blade P5, since it can extract some of the rotational energy in the downwash of the upper blade P2 and can redirect the rotating downwash into a more vertical path. However, in overlap area A2, blades P2 and P6 move in the same direction, which can reduce lift on the bottom blade P6.

FIG. 4 shows an embodiment 5B with a drone rotational offset that maximizes blade overlap area A1 and minimizes area A2. The lower drone may be positioned such that the lower propeller disks P5, P6, P7, and P8 maximally overlap in beneficial areas (hatched) while not overlapping the motors 5 or motor arms 16 in the top view. Legs 18 may extend downward and outward from the motors 14 or motor arms 16 if wanted.

Figure 7:
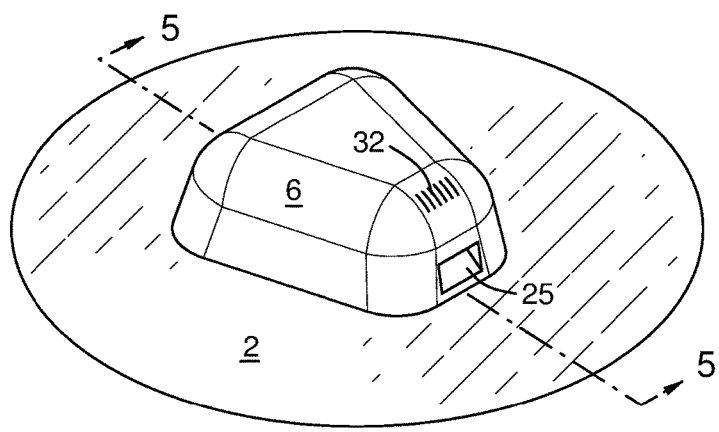
FIG. 7 is a perspective view of the top surface of a drone with a coupling protrusion for the socket of FIG. 6.

FIG. 5 is a sectional view taken on line 5-5 of FIG. 7 when two drones are coupled. The lower drone 2 has a coupling protrusion 6 that fits into a coupling socket 8 in the upper drone 4. A hook 22 on the upper drone 2 extends into a slot 24 in a first side of the coupling protrusion 6. The hook is urged by a spring 26 to fall into the slot. An actuator 28 is controlled by a control system in the upper drone to lock the hook in the slot and retract the hook from the slot for drone separation. A second hook 23 on the upper drone 4 extends into a second slot 25 on the opposite side of the coupling protrusion 6 from the first hook 22. The second hook is likewise urged by a second spring 27 and controlled by a second actuator 29. A first set of contacts 32 on the lower drone 2 engage matching contacts 34 on the upper drone 4 to communicate data and power sharing between the drones.

The upper and lower coupling parts 6, 8 engage two vertically stacked drones 2, 4 in a predetermined relative rotational orientation of the two drones about a common centerline 36 to offset the upper propellers from the lower propellers by a certain amount as seen from above. Each drone in a fleet of drones may have both a coupling protrusion 6 on the top of the drone and a coupling socket 8 on the bottom of the drone.

FIG. 5 is just an example of a specific coupling design. Other coupling designs may be used within the scope of the invention. In another embodiment (not shown) multiple hooks may be provided in a circular array around the bottom of the upper drone to latch into a circular array of slots on the upper surface of the lower drone. For example, four coupling hooks may be used in this embodiment. A separate indexing protrusion or key may be provided in the bottom of the upper drone to fit into a matching slot in the top of the lower drone to enforce a relative rotational orientation of the drones. The lower drone may have landing guidance markings on the upper surface that are analyzed by the control system of the upper drone via a camera in the bottom of the upper drone to guide landing of the upper drone on the lower drone in the correct orientation.

Figure 6:
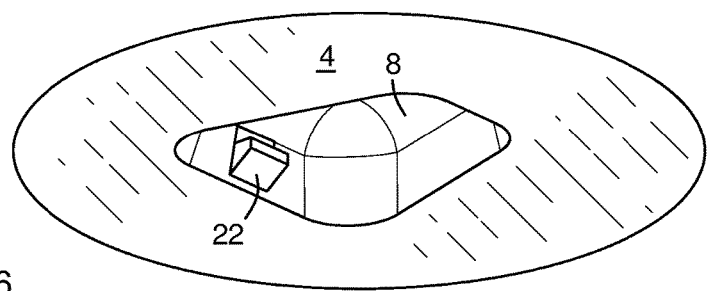
FIG. 6 is a perspective view of the bottom surface of a drone body with a coupling socket.

FIG. 6 is a perspective view of the bottom surface of body of a drone 4 with a coupling socket 8. A latch hook 22 is actuated by a control system of the drone 4. A second latch hook (hidden) may be provided on the opposite end 23 of the socket.

FIG. 7 is a perspective view of the top surface of body of a drone 2 with a coupling protrusion 6. A latch slot 25 is provided to receive a second latch hook (hidden) in the coupling socket 8 as shown in FIG. 5. Electrical contacts 32 are provided to connect with matching contacts in the coupling socket 8 of FIG. 5 (hidden) to provide data and power communication between the stacked drones 2 and 4. The shape of the coupling parts 6 and 8 enforces a predetermined relative rotational orientation of the upper and lower drones.

The upper drone 4 can land on the lower drone, self-center on the coupling protrusion 6, and automatically attach thereto by a springs in the opposed latch hooks. The stacked configuration serves not only for increasing lift with two active drones, but allows retrieval of a disabled drone, for example one having a disabled motor. A disabled drone in a prior art lateral array of drones can imbalance the lift of the array, making it inoperable. Such laterally connected drones require at least two drones to rescue a disabled drone, since the disabled drone must be in the center of the array. However, a disabled drone in a vertical stack does not imbalance lift, so the present invention requires only one drone to rescue a disabled drone.

Figure 8:
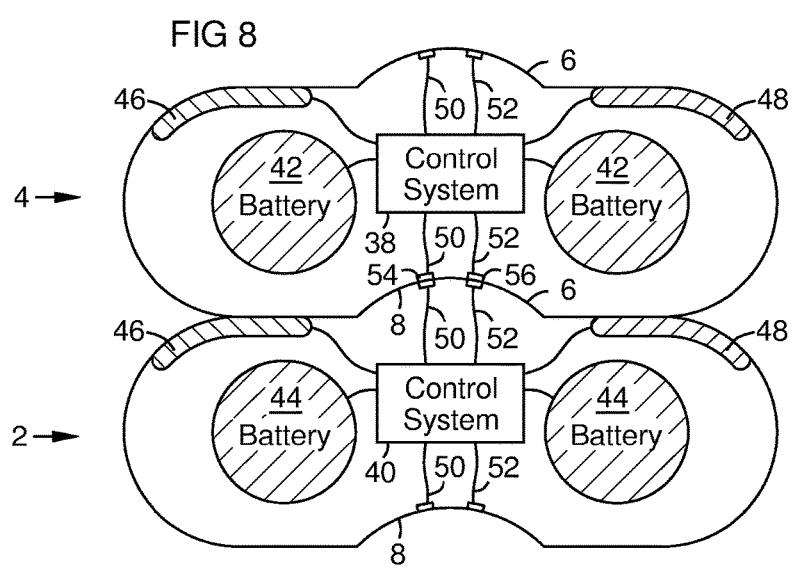
FIG. 8 is a schematic view of a unified control system in stacked drones.

FIG. 8 is a schematic view of a unified control system in the stacked drones. Each drone has an independent control system 38, 40 for independent flight. Each control system is connected to respective batteries 42, 44, a radio control antenna 46, and a GPS receiver 48 as known in the art. Each control system includes a power module that monitors the batteries and provides power to all other system components, including the motors (not shown). Control communication 50 and power communication 52 are established by respective interfaces 54, 56 between the drones, for example by electrical contacts (32, 34 in FIG. 5) that engage when the drones are coupled. Such interface may follow an established physical and/or electrical interface standard. For example, a USB electrical and power interface standard may be used in order to use existing USB circuit and driver designs in the controllers, while the physical interface for the contacts may be custom. Upon interconnection, the control systems perform a handshaking protocol that establishes one of the control systems 38 as master and the other control system(s) 40 as slave(s). Now the master control system controls all drones in the stack so they are coordinated and may share power as needed.

Figure 9:
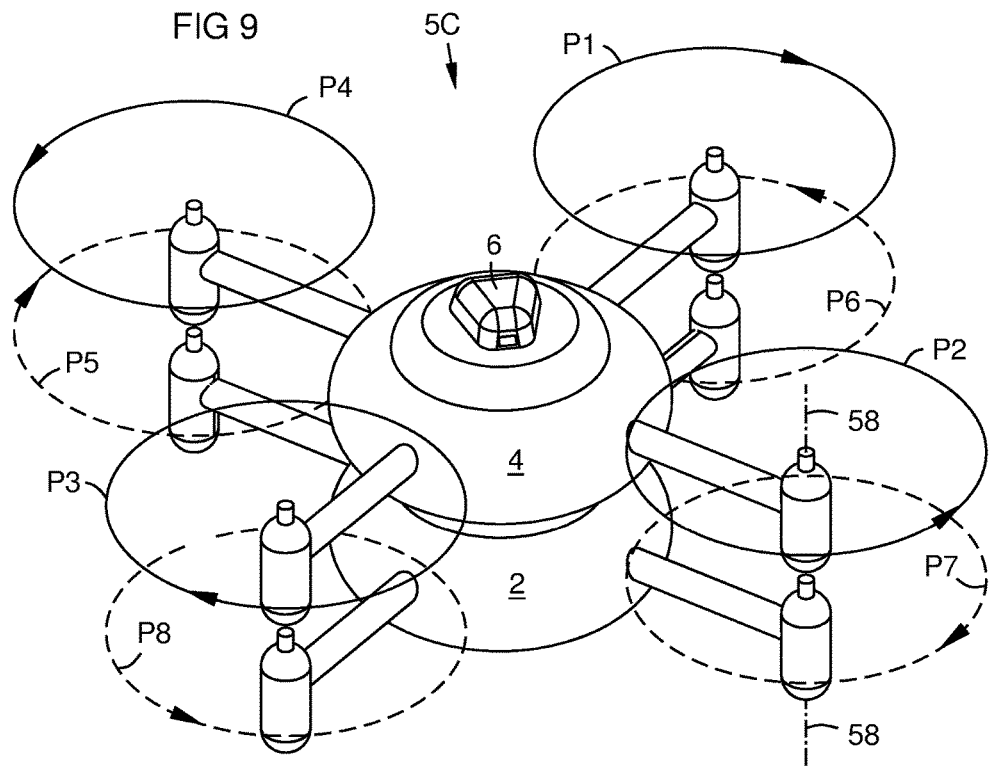
FIG. 9 is a perspective view of an embodiment with two drones stacked and offset rotationally by 90 degrees to provide counter-rotating propellers.

FIG. 9 is a perspective view of an embodiment 5C with two drones 2, 4 stacked and offset rotationally by 90 degrees. Each upper propeller P1, P2, P3, P4 is paired with a coaxially counter-rotating lower propeller P6, P7, P8, P5 respectively. For example, upper propeller P2 is coaxial 58 and counter-rotating with lower propeller P7. This allows lower propeller P7 to extract rotational energy from the downwash of the upper propeller P2, providing aerodynamic synergy in the combined flying machine.

The offset that provides counter-rotating propellers depends on the number of propellers and how they are organized for clockwise and counterclockwise rotation. Adjacent propellers normally rotate in opposite directions on a drone. If drones with 6 propellers in this arrangement are stacked, the relative rotational offset for counter-rotating propellers in the combined flying machine is 60 degrees. If drones with 8 propellers in this arrangement are stacked, the relative rotational offset for counter-rotating propellers in the combined flying machine is 45 degrees. Going sequentially around an 8-propeller drone, the propeller directions can be represented as < > < > < > < >, where < represents clockwise, and > represents counterclockwise. Using drones with opposite rotation directions in adjacent propellers, the drone rotational offset for coaxial counter-rotation in stacked drones is an odd multiple of 360/N degrees, where N is the number of propellers. For example with eight propellers 1*360/8=45 degrees or 3*360/8=135 degrees.

This is different if the propellers are arranged differently on the drone. For example, a drone with 8 propellers may have four groups of two propellers rotating in the same direction. Going sequentially around an 8-propeller drone with this arrangement, the propeller directions can be represented as < < > > < < > >. With this arrangement, the drone rotational offset for counter-rotating propellers in the stacked drones is an odd multiple of 360/X, where X is the number of rotation groups. In the 8 propeller example above with 4 groups of 2 propellers, 1*360/4=90 degrees or 3*360/4=270 degrees.

Figure 10:
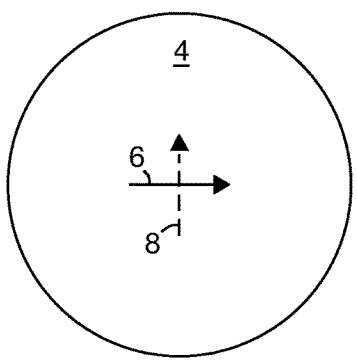
FIG. 10 is a top schematic view of a drone body with a top protrusion represented by a solid-line arrow, and a bottom socket represented by a dashed arrow.

FIG. 10 is a top schematic view of a drone body 4 with a top protrusion represented by arrow 6, and a bottom socket represented by dashed arrow 8. The bottom socket is offset from the top protrusion by 90 degrees, resulting in the configuration of FIG. 9. The unified master/slave control system previously described now controls the lower drone 90 degrees differently from the upper drone, so they both fly in the same direction. The bottom socket may be offset by another amount if a different embodiment such as 5A (FIG. 3) or 5B (FIG. 4) is wanted.

The present invention connects two or more drones in a vertically stacked configuration that provides more lift for larger packages than a single drone. A stacked drone configuration has the following advantages over a lateral array of drones:

a) Stacked drones are more rigid because coupling is made directly between the drone bodies instead of between propeller guards or other peripheral parts.

b) Stacked drones weigh less than a lateral array since peripheral walls and arms strong enough for side-to-side attachments are not needed.

c) Stacked drones use less wiring for interconnection because wires do not span from the periphery to the drone body.

d) Stacked drones provide a smaller footprint than a lateral array of drones, providing a smaller landing area requirement.

e) Stacked drones can provide aerodynamic synergy because the lower propellers can extract rotational energy from the downwash of the upper propellers that would otherwise be wasted.

f) A single stackable drone can rescue a disabled drone. Prior art lateral arrays require at least two drones to rescue a disabled drone.

While various embodiments of the present invention have been shown and described herein, such embodiments are provided by way of example only. Changes and substitutions may be made without departing from the invention. Accordingly, it is intended that the invention be limited only by the scope and intended meaning of the appended claims.

The invention claimed is:

1. A set of independently flyable drones comprising:
 a first drone comprising a top side with a first coupling mechanism;
 a second drone comprising a bottom side with a second coupling mechanism;
 wherein the two coupling mechanisms releasably interconnect the first and second drones in a vertically stacked combined flying machine with the second drone stacked on top of the first drone, the first and second drones having a common central vertical axis; and
 wherein the coupling mechanisms rotationally offset the first and second drones from each other about the common central vertical axis to minimize negative aerodynamic effects of downwash from propellers of the upper second drone on propellers of the lower first drone.

2. The set of independently flyable drones of claim 1, further comprising:
 a first set of electrical contacts on the top side of the first drone and a second set of electrical contacts on the bottom side of the second drone that electrically interconnect the first and second drones when the first and second coupling mechanisms are engaged.

3. The set of independently flyable drones of claim 2, further comprising: a control system in each drone of the set of drones, wherein the control system controls the drone for independent flight, and wherein a master/slave relationship is established between the control systems in the first and second drones when the coupling mechanisms are engaged, providing unified control of the two drones acting as a single flying machine.

4. The set of independently flyable drones of claim 2, wherein the electrical contacts further provide a power interconnection between the first and second drones in the stacked combined flying machine, and further comprising a battery power control module in each drone that share battery power between the first and second drones.

5. The set of independently flyable drones of claim 1, wherein the first and second coupling mechanisms enforce a predetermined relative rotational position between the first and second drones about the central vertical axis in the combined flying machine that positions propellers of the upper and lower drones for coaxially counter-rotating propellers in the second drone relative to propellers of the first drone.

6. The set of independently flyable drones of claim 1, wherein the first and second coupling mechanisms enforce a predetermined relative rotational position between the first and second drones about the central vertical axis in the combined flying machine that positions upper and lower propellers of the respective upper and lower drones for minimal total propeller disk overlap in a top view.

7. The set of independently flyable drones of claim 1, wherein the first and second coupling mechanisms enforce a predetermined relative rotational position between the first and second drones about the central vertical axis in the combined flying machine that positions propeller disks of the first and second drones for no overlap in areas of rotation in the same direction in a top view.

8. The set of independently flyable drones of claim 1, wherein the first and second coupling mechanisms enforce a predetermined relative rotational position between the first and second drones about the central vertical axis in the combined flying machine that positions propeller disks of the first and second drones for maximum overlap in areas of rotation in opposite directions with no propeller disks of the first drone overlapping propeller motors or motor support arms of the second drone in a top view.

9. The set of independently flyable drones of claim 1, wherein the first coupling mechanism comprises a protrusion or convexity on the top of the first drone, and the second coupling mechanism comprises a mating socket or concavity on the bottom of the second drone, wherein the first coupling mechanism comprises a shape that mates with the second coupling mechanism in only one relative position of the first and second coupling mechanisms, and indexes the first and second drones in a predetermined relative rotational position about the central vertical axis in the combined flying machine.

10. The set of independently flyable drones of claim 9, wherein the first and second coupling mechanisms comprise respective first and second sets of electrical contacts that interconnect control and power wires in the first and second drones, and wherein the second coupling mechanism comprises first and second hooks that engage respective first and second slots on opposite sides of the first coupling mechanism.

11. A fleet of independently flyable and independently controllable drones, each drone in the fleet comprising:
 a top side with a first coupling mechanism;
 a bottom side with a second coupling mechanism;
 wherein the first and second coupling mechanisms releasably interconnect any first and second drones in the fleet to form a vertically stacked combined flying machine with the second drone on top of the first drone, the first and second drones having a common central vertical axis; and
 wherein the coupling mechanisms rotationally offset the first and second drones from each other about the common central vertical axis to minimize negative aerodynamic effects of downwash from propellers of the upper second drone on propellers of the lower first drone.

12. The fleet of independently flyable and independently controllable drones of claim 11, further comprising:
 a control system in each drone of the fleet that controls the drone for independent flight, wherein a master/slave relationship is established between the control systems in the first and second drones when the coupling mechanisms are engaged that provide unified control of the combined first and second drones operating as a single flying machine;

a first set of electrical contacts on a top side of each drone and a second set of electrical contacts on the bottom side of each drone, wherein the first and second drones are electrically interconnected when the first and second coupling mechanisms are engaged, wherein the electrical contacts further provide a power interconnection between the first and second drones in the stacked combined flying machine; and a battery power control module in each drone that shares battery power between the first and second drones via the electrical contacts when they are interconnected.

13. The fleet of independently flyable and independently controllable drones of claim 11, wherein the first and second coupling mechanisms are rotationally offset by an odd multiple of 360/N degrees about the central vertical axis in the combined flying machine, providing coaxially counter-rotating propellers in the second drone relative to propellers of the first drone, where N is the number of propellers on each drone.

14. The fleet of independently flyable and independently controllable drones of claim 11, wherein the first and second coupling mechanisms enforce a predetermined relative rotational position between the first and second drones about the central vertical axis in the combined flying machine that positions upper and lower propellers of the respective upper and lower drones for minimal total propeller disk overlap in a top view.

15. The fleet of independently flyable and independently controllable drones of claim 11, wherein the first and second coupling mechanisms enforce a predetermined relative rotational position between the first and second drones about the central vertical axis in the combined flying machine that positions propeller disks of the first and second drones for no overlap in areas of rotation in the same direction in a top view.

16. The fleet of independently flyable and independently controllable drones of claim 11, wherein the first and second coupling mechanisms enforce a predetermined relative rotational position between the first and second drones about the central vertical axis in the combined flying machine that positions propeller disks of the first and second drones for maximum overlap in areas of rotation in opposite directions without the propeller disks of the first drone overlapping propeller motors of the second drone or support arms of said propeller motors of the second drone in a top view.

17. The fleet of independently flyable and independently controllable drones of claim 11, wherein the first coupling mechanism comprises a protrusion or convexity on the top of the first drone, and the second coupling mechanism comprises a mating socket or concavity on the bottom of the second drone, wherein the first coupling mechanism comprises a shape that mates with the second coupling mechanism in only one relative position of the first and second coupling mechanisms, and indexes the first and second drones in a predetermined relative rotational position about the central vertical axis in the combined flying machine.

18. The fleet of independently flyable and independently controllable drones of claim 17, wherein the first and second coupling mechanisms comprise respective first and second sets of electrical contacts that interconnect control and power wires in the first and second drones, and wherein the second coupling mechanism comprises first and second hooks that engage respective first and second slots on opposite sides of the protrusion or convexity.

19. The set of independently flyable drones of claim 1, wherein the coupling mechanisms when engaged enforce a rotational offset between the first and second drones about the common vertical axis that positions lower and upper propeller disks of the first and second drones respectively for an overlap of the lower and upper propeller disks in a top view selected from the set consisting of:
   a) a rotational offset that minimizes a total overlap of the lower and upper propeller disks;
   b) a rotational offset that minimizes a total overlap of the lower and upper propeller disks in areas of rotation in a same direction, and maximizes a total overlap of the lower and upper propeller disks in areas of rotation in opposite directions, wherein no propeller disks of the first drone overlap propeller motors or motor support arms of the second drone in the top view; and
   c) a rotational offset wherein each upper propeller is paired with a coaxially counter-rotating lower propeller.

* * * * *